(12) United States Patent
Niino

(10) Patent No.: US 8,140,893 B2
(45) Date of Patent: Mar. 20, 2012

(54) FAULT-TOLERANT SYSTEM

(75) Inventor: Ryuta Niino, Tokyo (JP)

(73) Assignee: NEC Corporation, Tokyo (JP)

( * ) Notice: Subject to any disclaimer, the term of this patent is extended or adjusted under 35 U.S.C. 154(b) by 77 days.

(21) Appl. No.: 12/725,147

(22) Filed: Mar. 16, 2010

(65) Prior Publication Data

US 2010/0241909 A1    Sep. 23, 2010

(30) Foreign Application Priority Data

Mar. 18, 2009    (JP) .................... 2009-065988

(51) Int. Cl.
*G06F 11/00* (2006.01)

(52) U.S. Cl. .......................... 714/11; 714/12
(58) Field of Classification Search .............. 714/11, 714/12
See application file for complete search history.

(56) References Cited

U.S. PATENT DOCUMENTS

| | | | |
|---|---|---|---|
| 6,633,996 B1* | 10/2003 | Suffin et al. ............ | 714/4.4 |
| 6,751,749 B2* | 6/2004 | Hofstee et al. .......... | 714/11 |
| 6,862,693 B2* | 3/2005 | Chaudhry et al. ....... | 714/11 |
| 6,874,052 B1* | 3/2005 | Delmonico ............. | 710/305 |
| 6,938,183 B2* | 8/2005 | Bickel .................. | 714/12 |
| 7,124,319 B2* | 10/2006 | Watkins et al. .......... | 714/12 |
| 7,519,856 B2* | 4/2009 | Mizutani ............... | 714/11 |
| 7,610,509 B2* | 10/2009 | Abe ..................... | 714/11 |
| 7,797,575 B2* | 9/2010 | Clark et al. ............ | 714/11 |
| 7,890,797 B2* | 2/2011 | Davies .................. | 714/10 |
| 2002/0144177 A1* | 10/2002 | Kondo et al. ........... | 714/13 |
| 2006/0236168 A1* | 10/2006 | Wolfe et al. ............ | 714/724 |
| 2008/0250185 A1* | 10/2008 | Clark et al. ............ | 710/306 |

FOREIGN PATENT DOCUMENTS

JP    2006-178616    7/2006

* cited by examiner

*Primary Examiner* — Marc Duncan
(74) *Attorney, Agent, or Firm* — Foley & Lardner LLP

(57) ABSTRACT

In a lockstep fault-tolerant system (10), each subsystem (1, 2) includes bridges (71 to 75) positioned between a CPU (21) and memory (11), between a CPU (22) and memory (12), between the CPU (21) and a northbridge (31), between the CPU (22) and the northbridge (31) and between the CPU (21) and the CPU (22) and creates checksums from relayed data, and an FT bus (81) for sending the created checksums to an FT controller (41). Furthermore, the FT controller (41) detects discrepancies by comparing checksums sent from the bridges (71 to 75) and checksums sent from the other subsystem received via a crosslink, and by this detects process discrepancies between the subsystems (1, 2).

6 Claims, 9 Drawing Sheets

FAULT-TOLERANT SYSTEM 200

FAULT-TOLERANT SYSTEM 300

RELATED FAULT-TOLERANT SYSTEM

FAULT-TOLERANT SYSTEM

INCORPORATION BY REFERENCE

This application is based on Japanese Patent Application No. 2009-065988, including specification, claims, drawings and summary. The disclosure of the above Japanese Patent Application is incorporated herein by reference in its entirety.

TECHNICAL FIELD

The present invention relates to a lockstep fault-tolerant system.

BACKGROUND ART

Fault-tolerant systems have been known from before in which components such as the CPU (Central Processing Unit), memory, PCI (Peripheral Component Interconnect) and the like are made redundant between subsystems in computer systems performing data processing so that if a malfunction occurs in one or more of the components, continuous operation is possible with no stoppage. The lockstep method, for example, is used in such fault-tolerant systems.

In a lockstep fault-tolerant system, the redundant subsystem components need to be in synchronous with each other and be executing the same processes. Accordingly, an FT (Fault Tolerant) controller is installed in order to achieve synchronicity among components in such fault-tolerant systems. This controller can compare the process details of redundant components and detect discrepancies in process details so that malfunctions in the system (discrepancies in processes among redundant components) are detected.

FIG. 9 is a block diagram showing the composition of a related fault-tolerant system.

For example, in a related fault-tolerant system including two subsystems as shown in the figure, FT controllers are placed between IO bridges and northbridges. In addition, each FT controller is linked to the other subsystem via crosslinking. The FT controllers compare data processed between the IO device side and the northbridge between the two subsystems, and detect system malfunctions by detecting discrepancies.

In addition, in the fault-tolerant system disclosed in Unexamined Japanese Patent Application KOKAI Publication No. 2006-178616 (hereinafter referred to as Patent Literature 1), an FT controller is positioned between the CPU and the IO devices, and in the northbridge (board controller) connecting the CPU and memory. In the fault-tolerant system of Patent Literature 1, the input/output bus of the CPU and memory goes through the northbridge, so process details between the CPU and memory can be compared between subsystems by the FT controller in the northbridge, making it possible to detect system malfunctions.

In the related fault-tolerant system shown in FIG. 9, only data processed between the IO device side and the northbridge are compared, so it is impossible to detect process malfunctions (synchronicity discrepancies) arising among other components (CPU, memory, northbridge and the like).

In addition, in the fault-tolerant system of Patent Literature 1, it is necessary to develop a complex, high-performance northbridge because the FT controller is inside the northbridge. Accordingly, system development time becomes lengthy and development costs tend to increase.

In addition, architecture directly linking CPU and memory has become more prevalent in recent years accompanying the increase in bandwidth between CPU and memory. In the fault-tolerant system disclosed in Patent Literature 1, it is necessary to link the memory and CPU via the northbridge, so it is impossible to create the fault-tolerant system disclosed in Patent Literature 1 with this kind of architecture.

The present invention is invented in view of the above circumstances and an exemplary object of the present invention is to provide a fault-tolerant system with relatively simple composition and enabling detection of malfunctions arising among various components even with architecture directly linking CPU and memory.

SUMMARY

In order to resolve the above problem, the fault-tolerant system according to a first exemplary aspect of the present invention is a fault-tolerant system provided with a plurality of subsystems having each similar hardware and software, with similar processes executed among these subsystems through the lockstep method,
wherein each of the plurality of subsystems includes:
a control unit for relaying communications between a northbridge and an IO bridge and for connecting to other subsystems,
an error detection data creation unit positioned at least between either CPUs (central processing units), CPU and memory, or CPU and northbridge, this error detection data creation unit creating error detection data from data exchanged between the two devices between which the unit is positioned, and
a signal transmission circuit for connecting the error detection data creation unit and the control unit;
wherein the control unit detects discrepancies in processes between subsystems by comparing and detecting mismatches between error detection data created by the error detection data creation unit received via the signal transmission circuit and error detection data received from other subsystems.

The fault-tolerant system according to a second exemplary aspect of the present invention is a fault-tolerant system provided with a plurality of subsystems having each similar hardware and software, with similar processes executed among these subsystems through the lockstep method,
wherein each of said plurality of subsystems includes:
a control means for relaying communications between said northbridge and said IO bridge and for connecting to other subsystems,
an error detection data creation means positioned at least either between said plurality of CPUs, between said CPU and said memory, or between said CPU and said northbridge, said error detection data creation means for creating error detection data from data exchanged between the pair between which said unit is positioned, and
a signal transmission circuit for connecting said error detection data creation means and said control means;
wherein said control means for detecting discrepancies in processes among said plurality of subsystems by comparing and detecting mismatches in error detection data created by said error detection data creation means received via said signal transmission circuit and error detection data received from said other subsystems.

BRIEF DESCRIPTION OF THE DRAWINGS

These objects and other objects and advantages of the present invention will become more apparent upon reading of the following detailed description and the accompanying drawings in which.

EXEMPLARY EMBODIMENTS

Figure 1:
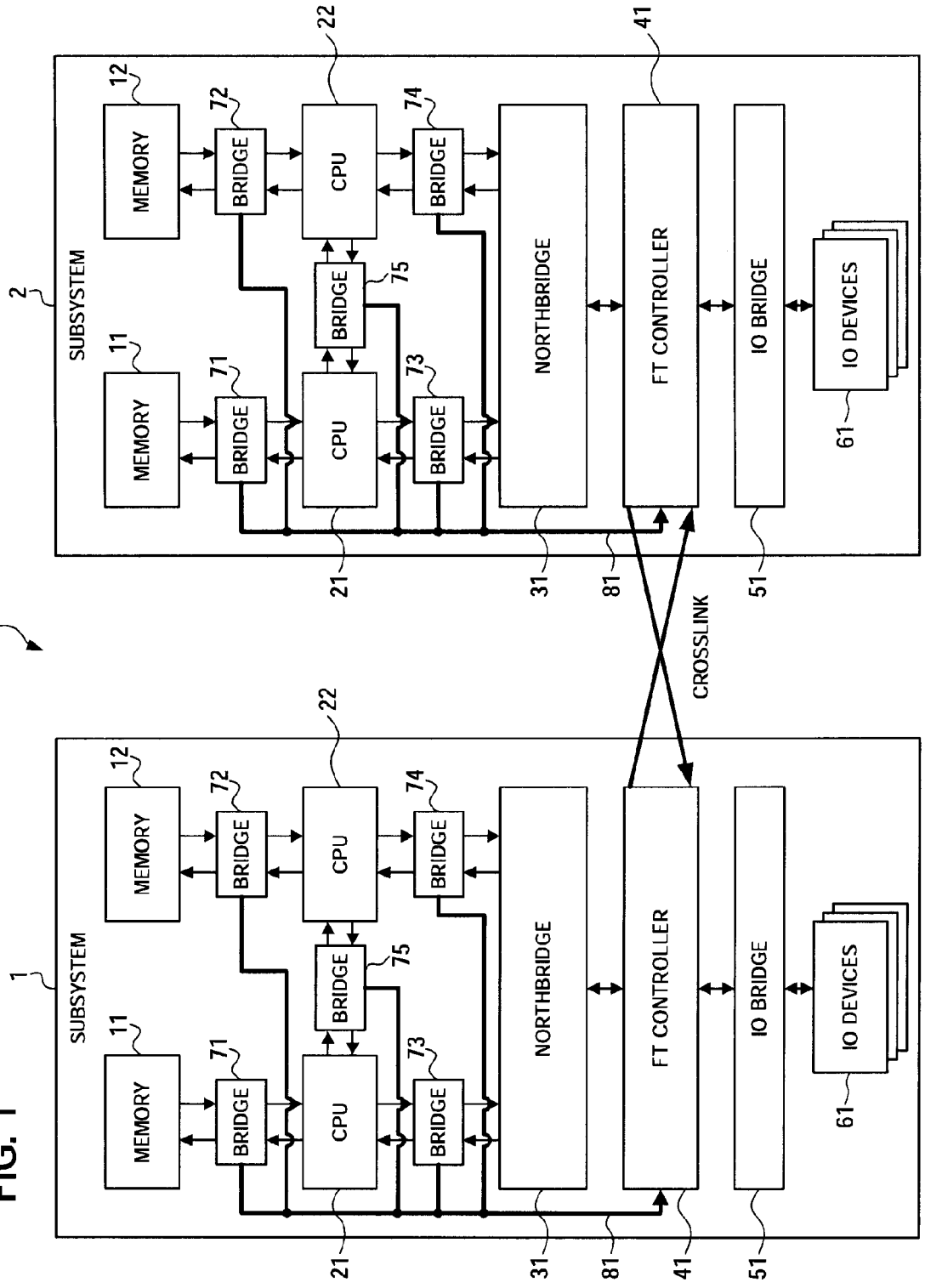
FIG. 1 is a block diagram showing the composition of a fault-tolerant system according to a first exemplary embodiment of the present invention.

A first exemplary embodiment of the present invention will be described in detail with reference to the attached drawings. Common reference numbers are used for parts that are common or comparable in the drawings.

First Exemplary Embodiment

FIG. 1 is a block diagram showing an example of the composition of a fault-tolerant system 10 according to a first exemplary embodiment of the present invention. The fault-tolerant system 10 is provided with subsystems 1 and 2 composed of the same hardware and software and each operating with the same clock.

The subsystems 1 and 2 are each composed of two memories 11 and 12, two CPUs 21 and 22, a northbridge 31, an FT controller 41, an IO bridge 51, various IO devices 61 and five bridges 71 to 75.

The CPUs 21 and 22 each execute operational processes. In addition, the CPUs 21 and 22 are connected via the bridge 75 and can exchange data with each other.

The memories 11 and 12 are connected to the CPUs 21 and 22 via the bridges 71 and 72, respectively, and store data and are used as work areas for the CPUs 21 and 22.

The northbridge 31 is an LSI (Large Scale Integration) chip connecting the CPUs 21 and 22 with the FT controller 41. Specifically, the northbridge 31 is connected to the CPUs 21 and 22 via the bridges 73 and 74, respectively. In addition, the northbridge 31 is connected to the FT controller 41.

The FT controller 41 relays communications between the northbridge 31 and the IO bridge 51, and also has various functions for realizing fault-tolerance through the lockstep method.

Specifically, the FT controller 41, for example, receives error detection data (checksum) output from the each bridge 71 to 75 within the system, via an FT bus 81. In addition, the FT controller 41 similarly receives a checksum from the other subsystem via a crosslink. Furthermore, the FT controller 41 compares these two checksums and determines that an error has occurred (a synchronization loss between subsystems 1 and 2) when there is a discrepancy, and then performs a process detaching one of the subsystems 1 or 2 from the system.

The IO bridge 51 is an interface bridge such as a PCI (Peripheral Component Interconnect) bus, a USB (Universal Serial Bus), an IEEE1394 or the like, and accomplishes serial transfers between the various IO devices 61 and the FT controller 41.

The IO devices 61 are various types of devices such as hard disk drives, LAN (Local Area Network) ports or the like and are connected to the IO bridge 51.

The bridges 71 to 75 are respectively positioned between the CPU 21 and the memory 11, between the CPU 22 and the memory 12, between the CPU 21 and the northbridge 31, between the CPU 22 and the northbridge 31 and between the CPU 21 and the CPU 22, and relay data (packets) exchanged between the two. In addition, the bridges 71 to 75 create checksums from this exchanged data, and send these to the FT controller 41 via an FT bus 81.

Figure 2:
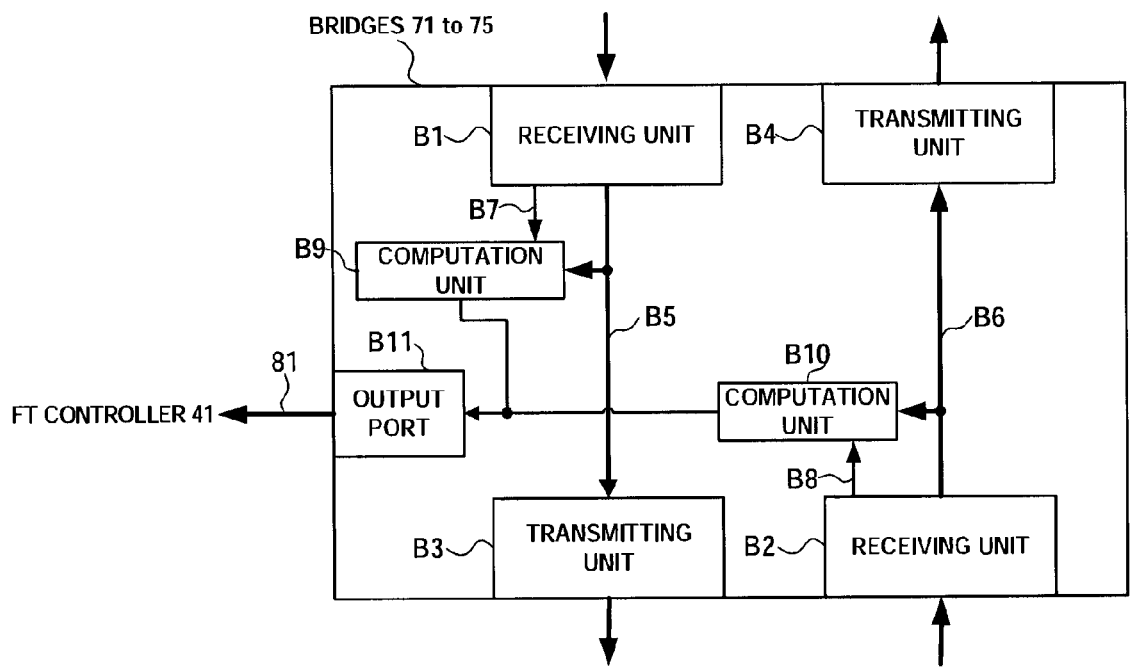
FIG. 2 is a block diagram showing the composition of a bridge.

FIG. 2 shows the composition of the bridges 71 to 75. The bridges 71 to 75 each include receiving units B1 and B2, transmitting units B3 and B4, internal buses B5 and B6, clock buses B7 and B8, computation units B9 and B10 and an output port B11.

The receiving units B1 and B2 are each equipped with a SerDes (Serializer/Deserializer) circuit or the like, parallelize data exchanged between the pairs between which the bridges 71 and 75 are respectively positioned (either between the CPU 21 and the memory 11, between the CPU 22 and the memory 12, between the CPU 21 and the northbridge 31, between the CPU 22 and the northbridge 31 or between the CPU 21 and the CPU 22), and output the result to the internal buses B5 and B6, respectively. In addition, the receiving units B1 and B2 send clock signals (operation clocks) to the computation units B9 and B10, respectively, via the clock buses B7 and B8, respectively, with the timing of receiving packets.

The transmitting unit B3 and B4 are each equipped with a SerDes (Serializer/Deserializer) circuit or the like, serialize the parallel packets received from the internal buses B5 and B6 and send the result to an output destination.

The internal buses B5 and B6 are buses that respectively connect either the receiving unit B1 and the transmitting unit B3, or the receiving unit B2 and the transmitting unit B4. In addition, the internal buses B5 and B6 are respectively connected to the computation units B9 and B10, and the computation units B9 and B10 can analyze parallel packets transferred to the transmitting unit B3 from the receiving unit B1, or to the transmitting unit B4 from the receiving unit B2.

The computation units B9 and B10 operate in synchronous with the operation clocks input from the receiving units B1 and B2, respectively, create error detection data (checksums) from packets flowing through the internal buses B5 and B6, and send the checksums to the output port B11. The computation units B9 and B10 do not send a checksum created from a single packet of data to the output port B11, but instead create one checksum from multiple packets of data flowing in succession through the internal buses B5 and B6 and send such checksums to the output port B11.

The output port B11 sends checksums received from the computation units B9 and B10 to the FT controller 41 via the FT bus 81.

Next, operation of the fault-tolerant system 10 according to this exemplary embodiment will be described.

The explanation here is for the process in the subsystem 1 in which the CPU 21 sends serial data composed of multiple packets to the CPU 22 via the bridge 75. The same data-sending process is executed with the same clock in the subsystem 2 as well.

Figure 3:
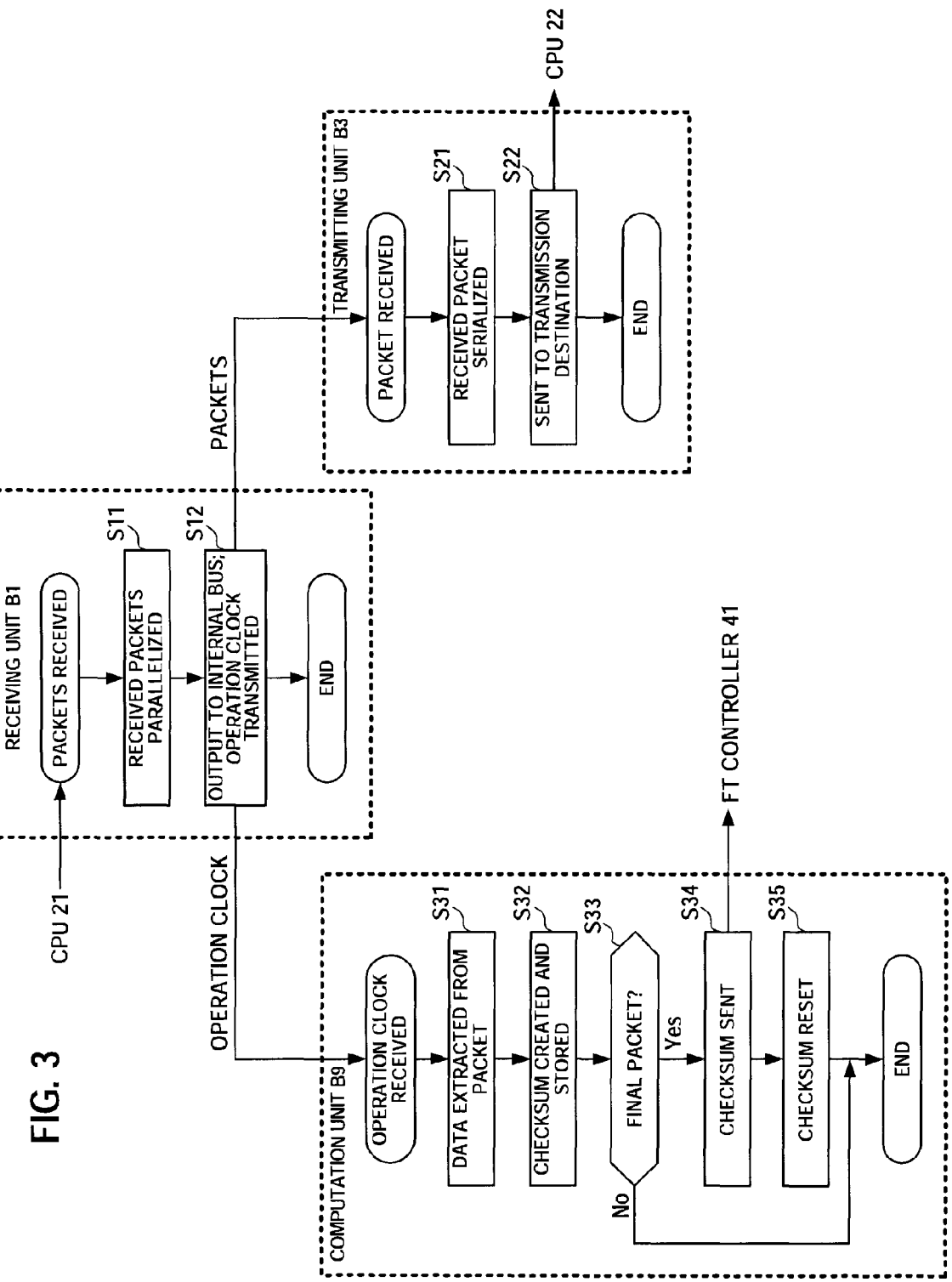
FIG. 3 is a flowchart for explaining processes performed by the bridge.

In the subsystem 1, the CPU 21 sends serial data composed of multiple packets to the bridge 75 one packet at a time. FIG. 3 is a flowchart used to explain the processes performed by the bridge 75. The bridge 75 executes the processes in the flowchart shown in this figure when one packet is received from the CPU 21.

First, the receiving unit B1 of the bridge 75, upon receiving one packet, parallelizes the received packet eight-fold or 16-fold in order to reduce operation frequency (step S11). Furthermore, the receiving unit B1 outputs the parallelized packets to the internal bus B5 and sends an operation clock to the computation unit B9 via the clock bus B7 (step S12). With that, the process of the receiving unit B1 concludes.

The parallelized packets streaming through the internal bus B5 are sent to the transmitting unit B3. Upon receiving parallelized packets from the internal bus B5, the transmitting unit B3 serializes the packets (step S21) and sends the result to the CPU 22, which is the transmission destination (step S22). With that, the process of the transmitting unit B3 concludes.

On the other hand, the computation unit B9, upon receiving an operation clock from the receiving unit B1, analyzes the packets flowing through the internal bus B5 and acquires data excluding headers from these packets (step S31).

Next, the computation unit B9 applies functions such as a CRC (Cyclic Redundancy Check) or an MD5 (Message Digest algorithm 5) on the data acquired in step S31, and creates and stores a checksum (step S32). When the computation unit B9 is storing a previously created checksum besides the data acquired in step S31, the computation unit B9 applies a function such as CRC and creates a new checksum for data linking the acquired data and the stored checksum.

Next, the computation unit B9 references information contained in the header portion of the packet flowing through the internal bus B5 and determines whether or not that packet is the final (end) packet of the data transmitted from the CPU 21 (step S33).

When it is determined that this packet is not the final packet (step S33; No), the process of the computation unit B9 concludes.

On the other hand, when it is determined that this is the final packet (step S33; Yes), the computation unit B9 sends the checksum created in step S32 to the output port B11, and the output port B11 sends the checksum to the FT controller 41 via the FT bus 81 (step S34). Furthermore, the computation unit B9 resets (erases) the sent checksum (step S35). With that, the process of the computation unit B9 concludes.

Next, the FT controller 41 of the subsystem 1 copies the checksum received from the bridge 75 via the FT bus 81, and sends this checksum to the FT controller 41 of the subsystem 2 via the crosslink.

In the subsystem 2, the FT controller 41 similarly sends the checksum received from the bridge 75 to the FT controller 41 of the subsystem 1 via the crosslink. Furthermore, the FT controller 41 of the subsystem 1 compares the checksum received from the subsystem 2 with the checksum received via the FT bus 81. When the result of the comparison is that a discrepancy has occurred between the two checksums, the FT controller 41 displays an error message on an unrepresented display device or the like, one of the two subsystems 1 or 2 is detached, and processing continues on the one subsystem 1 or 2 that is not detached.

In the FT controller 41 of the subsystem 2, a similar process for detecting errors may be executed by comparing the checksum received via the FT bus 81 with the checksum received from the subsystem 1. With that, the processes when data is sent to the CPU 22 from the CPU 21 in the subsystem 1 are concluded.

Figure 4:
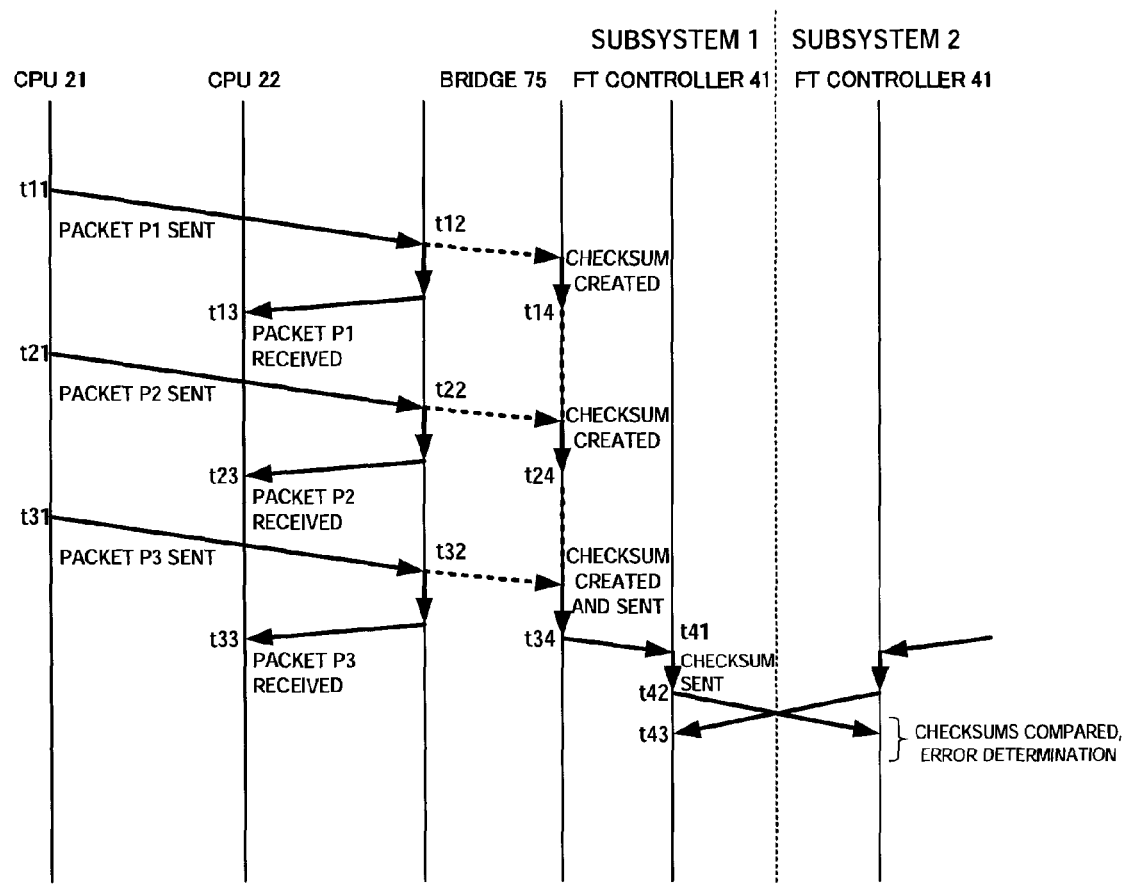
FIG. 4 is a timing chart for the process of transferring serial data between CPUs.

Next, the processes when three packets of serial data are sent from the CPU 21 to the CPU 22 will be described as a concrete example using the timing chart shown in FIG. 4.

First, at time t11, the CPU 21 of the subsystem 1 sends the first packet P1 of the serial data to the bridge 75. The bridge 75, upon receiving the packet P1 at time t12, sends the packet P1 to the CPU 22, and the CPU 22 receives the packet P1 (time t13). In addition, the bridge 75 creates and stores a checksum from the packet P1 (time t14).

Next, at time t21, the CPU 21 sends the next packet P2 of the serial data to the bridge 75. The bridge 75, upon receiving the packet P2 at time t22 sends the packet P2 to the CPU 22, and the CPU 22 receives the packet P2 (time t23). In addition, the bridge 75 creates and stores a checksum from data linking the packet P2 and the stored checksum created from the packet P1 (time t24).

Next, at time t31, the CPU 21 sends the final packet P3 of the serial data to the bridge 75. The bridge 75, upon receiving the packet P3 at time t32, sends the packet P3 to the CPU 22, and the CPU 22 receives the packet P3 (time t33). In addition, the bridge 75 creates a checksum from data linking the packet P3 and the stored checksum created from the packets P1 and P2, and then, because the received packet P3 is the final data, the bridge 75 sends the created checksum to the FT controller 41 via the FT bus 81 (time t34).

The FT controller 41, upon receiving the checksum from the bridge 75 at time t41, sends the copied checksum to the FT controller 41 of the subsystem 2 via the crosslink (time t42). Furthermore, at time t43 when a checksum sent from the FT controller 41 of the subsystem 2 through the same series of processes is received, a determination about the absence or presence of errors (process discrepancies) is made by comparing whether or not this checksum matches the checksum received at time t41 (time t43). Furthermore, when an error is detected, one of the two subsystems 1 and 2 is detached, and processes continue on the subsystem 1 or 2 that is not detached. With that, the series of processes when three packets of serial data are sent from the CPU 21 to the CPU 22 is concluded.

With this exemplary embodiment, by employing a simple composition in which a bridge having only the relatively simple function of creating checksums is positioned between the CPU and the various components (memory, northbridge, CPU), it is possible to detect malfunctions (process discrepancies) that arise between the various components. In addition, with this exemplary embodiment, the northbridge 31 is independent of the FT controller 41, so a typical northbridge can be employed to realize fault-tolerance. Accordingly, with the present exemplary embodiment it is possible to reduce system development times and development costs. In addition, with this exemplary embodiment, it is not necessary to connect the memory and the CPU via the northbridge, so it is possible to apply architecture directly linking CPU and memory.

Second Exemplary Embodiment

With the fault-tolerant system 10 according to the first exemplary embodiment, bridges were respectively positioned between CPU and memory, between CPU and CPU and between CPU and northbridge, and checksums were created from data (packets) exchanged between these pairs. With the second exemplary embodiment, processes by such bridges are replaced with snoopers.

Figure 5:
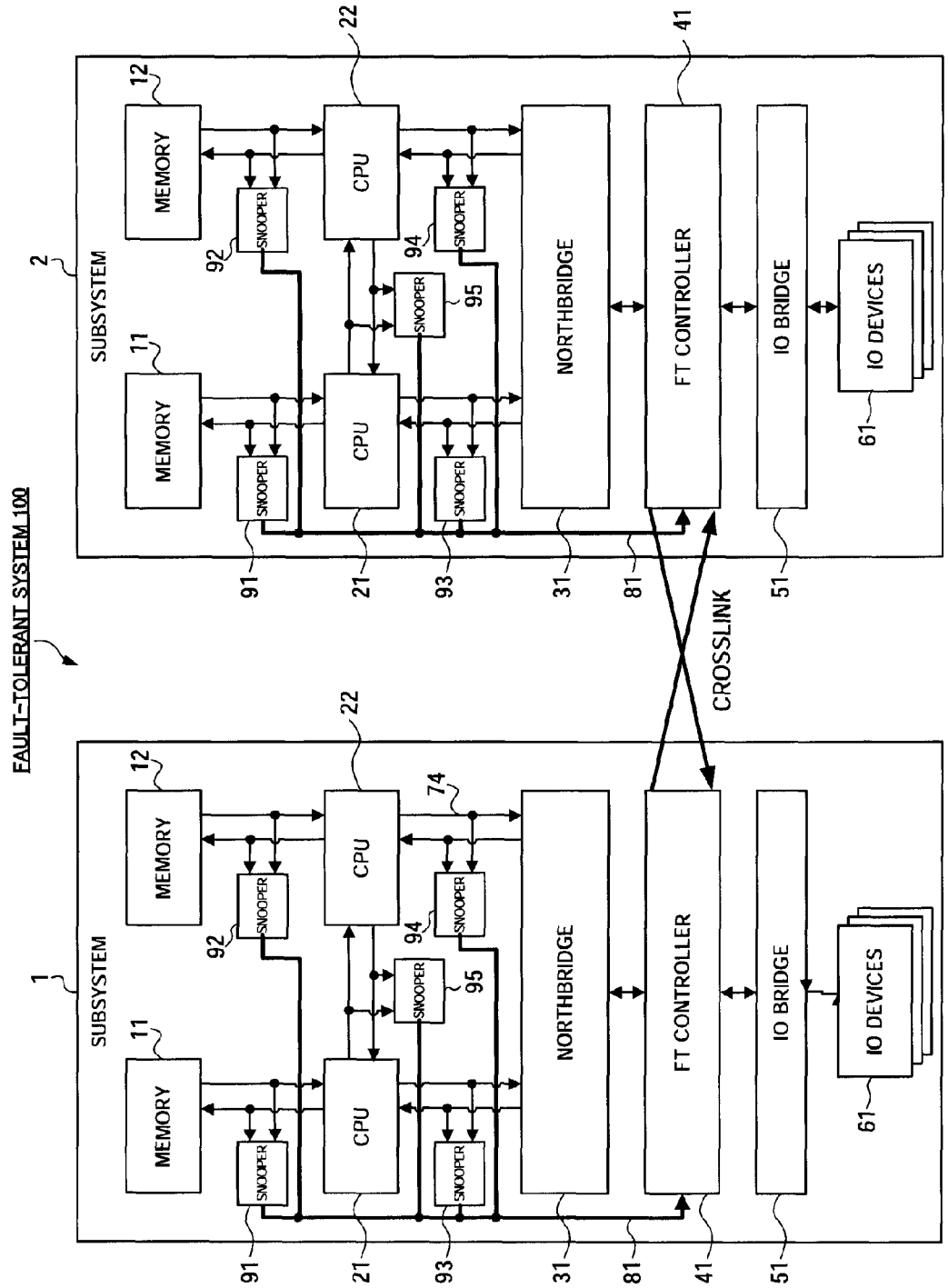
FIG. 5 is a block diagram showing the composition of a fault-tolerant system according to a second exemplary embodiment of the present invention.

FIG. 5 is a block diagram showing an example of the composition of a fault-tolerant system 100 according to the second exemplary embodiment of the present invention.

The fault-tolerant system 100 according to the second exemplary embodiment has snoopers 91 to 95 positioned between the CPU 21 and the memory 11, between the CPU 22 and the memory 12, between the CPU 21 and the northbridge 31, between the CPU 22 and the northbridge 31, and between the CPU 21 and the CPU 22, in place of the bridges 71 to 75.

Each snooper 91 to 95 monitors (snoops) data (packets) sent between the pairs between which that snooper is positioned. In addition, each snooper 91 to 95 creates checksums from data sent and received between the pair and sends the result to the FT controller 41 via the FT bus 81, the same as the bridges 71 to 75 of the first exemplary embodiment.

Figure 6:
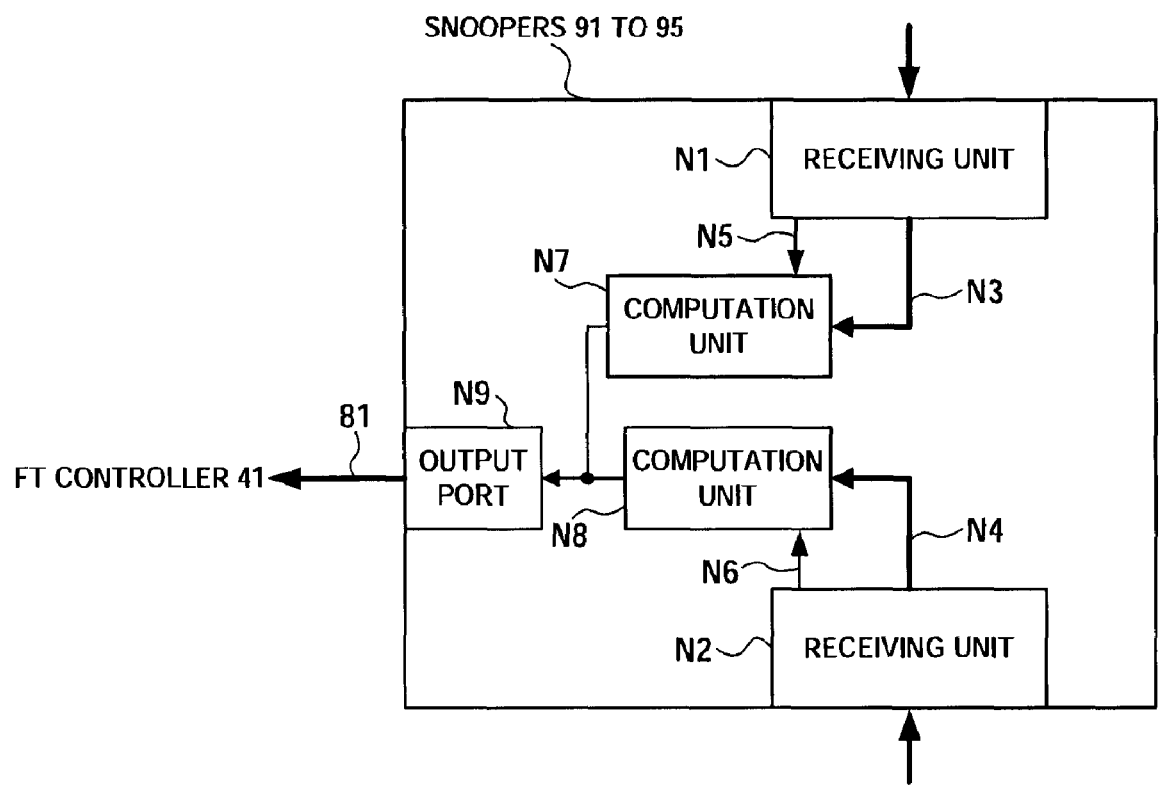
FIG. 6 is a block diagram showing the composition of a snooper.

FIG. 6 shows the composition of the snoopers 91 to 95. The snoopers 91 to 95 each include receiving units N1 and N2, internal buses N3 and N4, clock buses N5 and N6, computation units N7 and N8 and an output port N9.

The receiving units N1 and N2 each include a SerDes (Serializer/Deserializer) circuit or the like, parallelize data exchanged between the pairs between which the snoopers 91 to 95 are positioned (either between the CPU 21 and the memory 11, between the CPU 22 and the memory 12, between the CPU 21 and the northbridge 31, between the CPU 22 and the northbridge 31 or between the CPU 21 and the CPU 22), and output the result to the internal buses N3 and N4. In addition, the receiving units N1 and N2 send clock signals (operation clocks) to the computation units N7 and N8, respectively, via the internal buses N3 and N4, respectively, with the timing of receiving packets.

The internal buses N3 and N4 are buses that respectively connect either the receiving unit N1 and the computation unit N7, or the receiving unit N2 and the computation unit N8.

The computation units N7 and N8 operate in synchronous with the operation clocks input from the receiving units N1 and N2, respectively, create error detection data (checksums) by applying functions such as CRC, MD5 or the like to the data portion of packets flowing through the internal buses N3 and N4, and send the checksums to the output port N9, the same as the computation units B9 and B10 of the bridges 71 to 75. The computation units N7 and N8 do not send checksums created from a single packet of data to the output port N9, but instead create one checksum from multiple packages of data flowing in succession through the internal buses N3 and N4 and send such checksums to the output port N9.

The output port N9 sends checksums received from the computation units N7 and N8 to the FT controller 41 via the FT bus 81, the same as the output port B11 of the bridges 71 to 75.

In the fault-tolerant system 100 having this composition, when data (packets) are exchanged between components, the snoopers 91 to 95 positioned in between observe (snoop) this data, create checksums and send the checksums to the FT controller 41, the same as in the first exemplary embodiment. Furthermore, the FT controller 41 compares the checksum received via the FT bus 81 with the checksum received from the subsystem 1, and when a discrepancy is detected, determines that a malfunction (non-synchronicity) has occurred and executes a process detaching one of the two subsystems 1 and 2, the same as in the first exemplary embodiment.

Accordingly, even with the composition of the second exemplary embodiment, in which the snoopers 91 to 95 are positioned in place of the bridges 71 to 75, it is possible to similarly detect errors (process discrepancies). Furthermore, the snoopers 91 to 95 of the second exemplary embodiment do not require transmitting units in comparison to the bridges 71 to 75, making the composition even simpler and reducing costs.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

Figure 7:
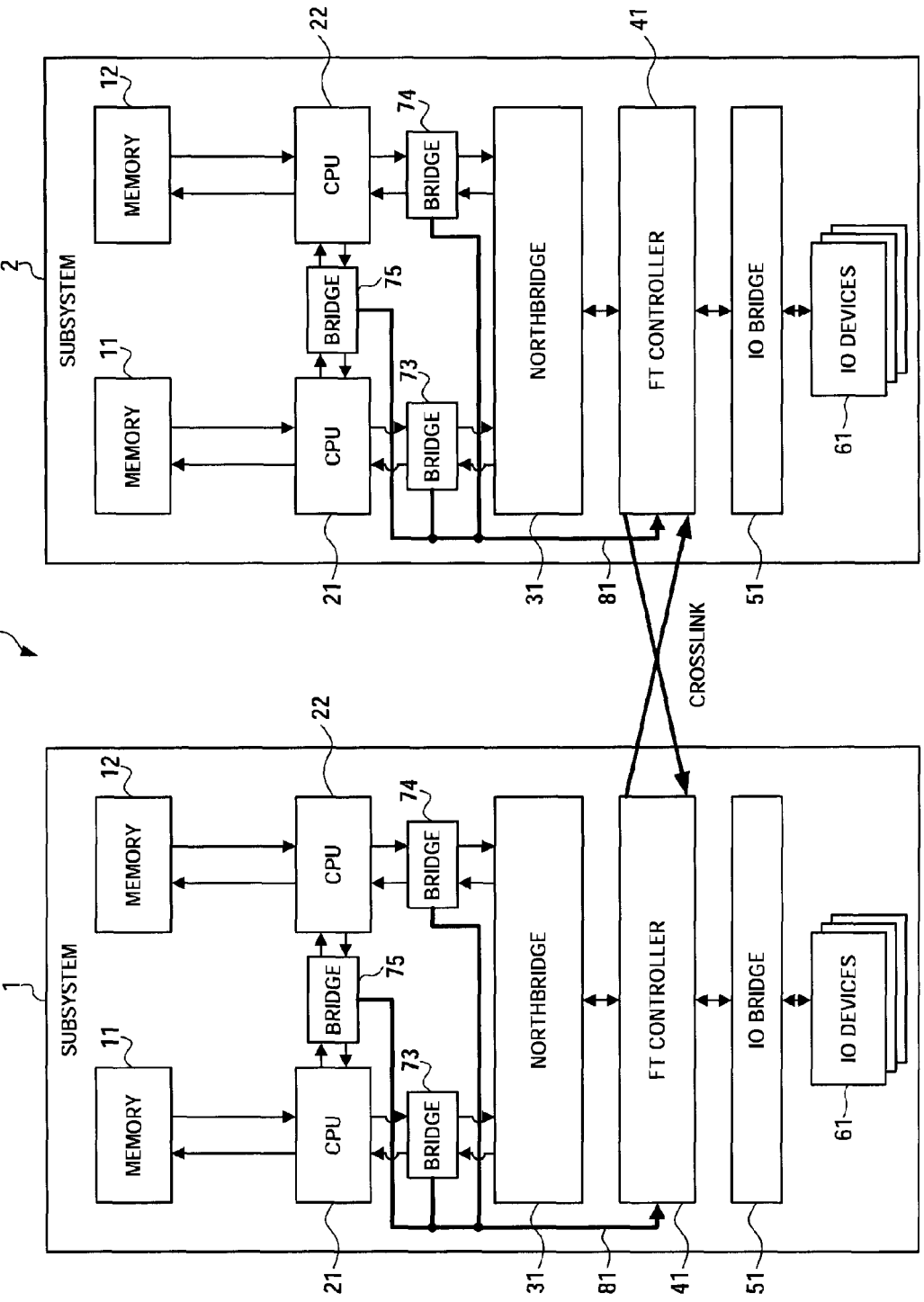
FIG. 7 is a block diagram showing a variation of the fault-tolerant system.

For example, it is not necessarily required that bridges or snoopers be positioned between all of the components. FIG. 7 is a block diagram showing a variation on the fault-tolerant system. Specifically, as shown in that drawing, a fault-tolerant system 200 may be constituted so that no bridge is positioned between the CPU 21 and the memory 11, or between the CPU 22 and the memory 12. In this case, it becomes impossible to detect process discrepancies between the two subsystems 1 and 2 for processes executed between the CPU 21 and the memory 11 and between the CPU 22 and the memory 12, but this would reduce the number of bridges and thus make it possible to reduce system development time and costs. Similarly, compositions are also possible in which no bridge or snooper is positioned between the CPU 21 and the CPU 22, or between the CPU 21 and the northbridge 31, or between the CPU 22 and the northbridge 31.

Figure 8:
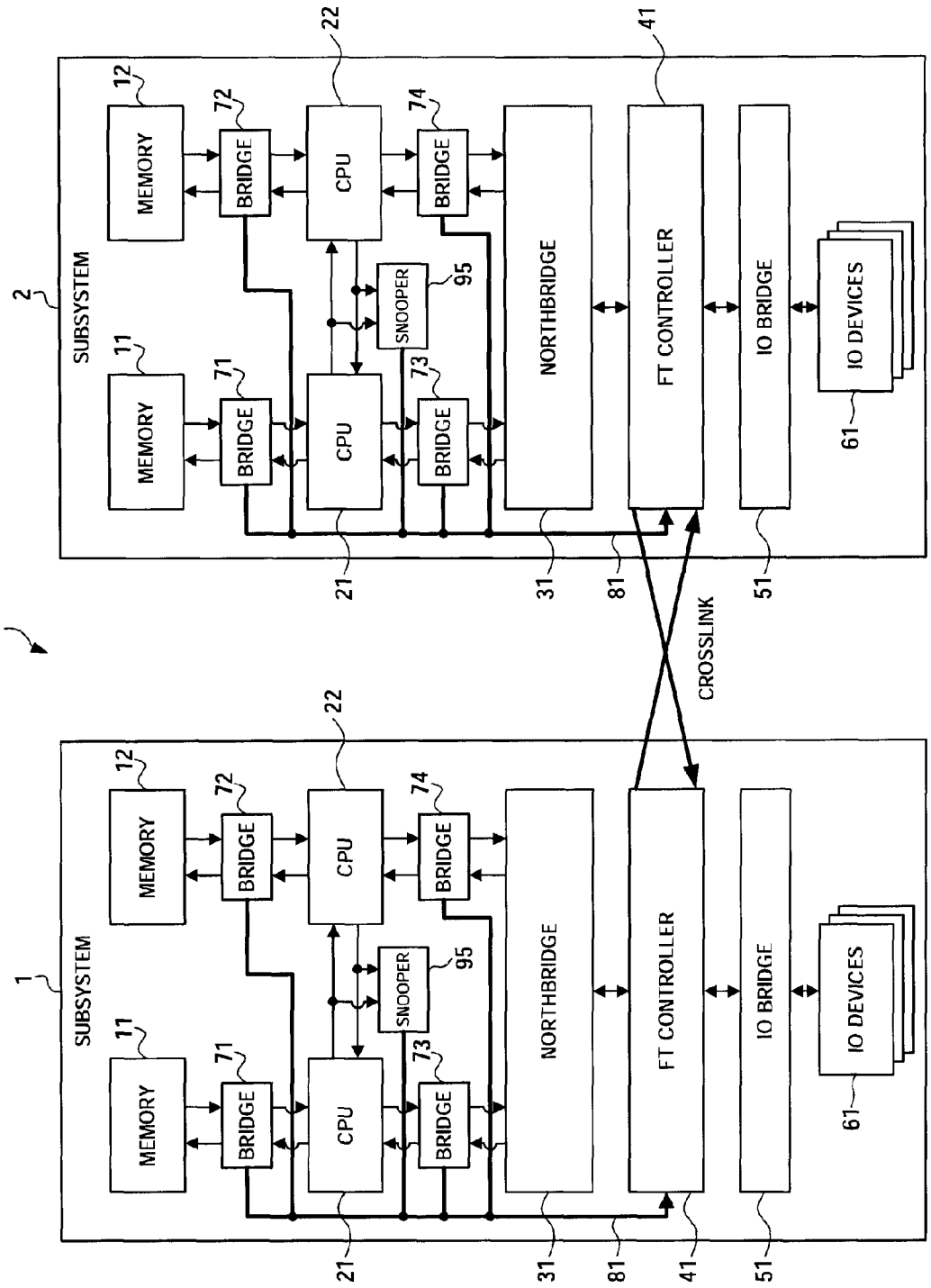
FIG. 8 is a block diagram showing a variation of the fault-tolerant system.
Figure 9:
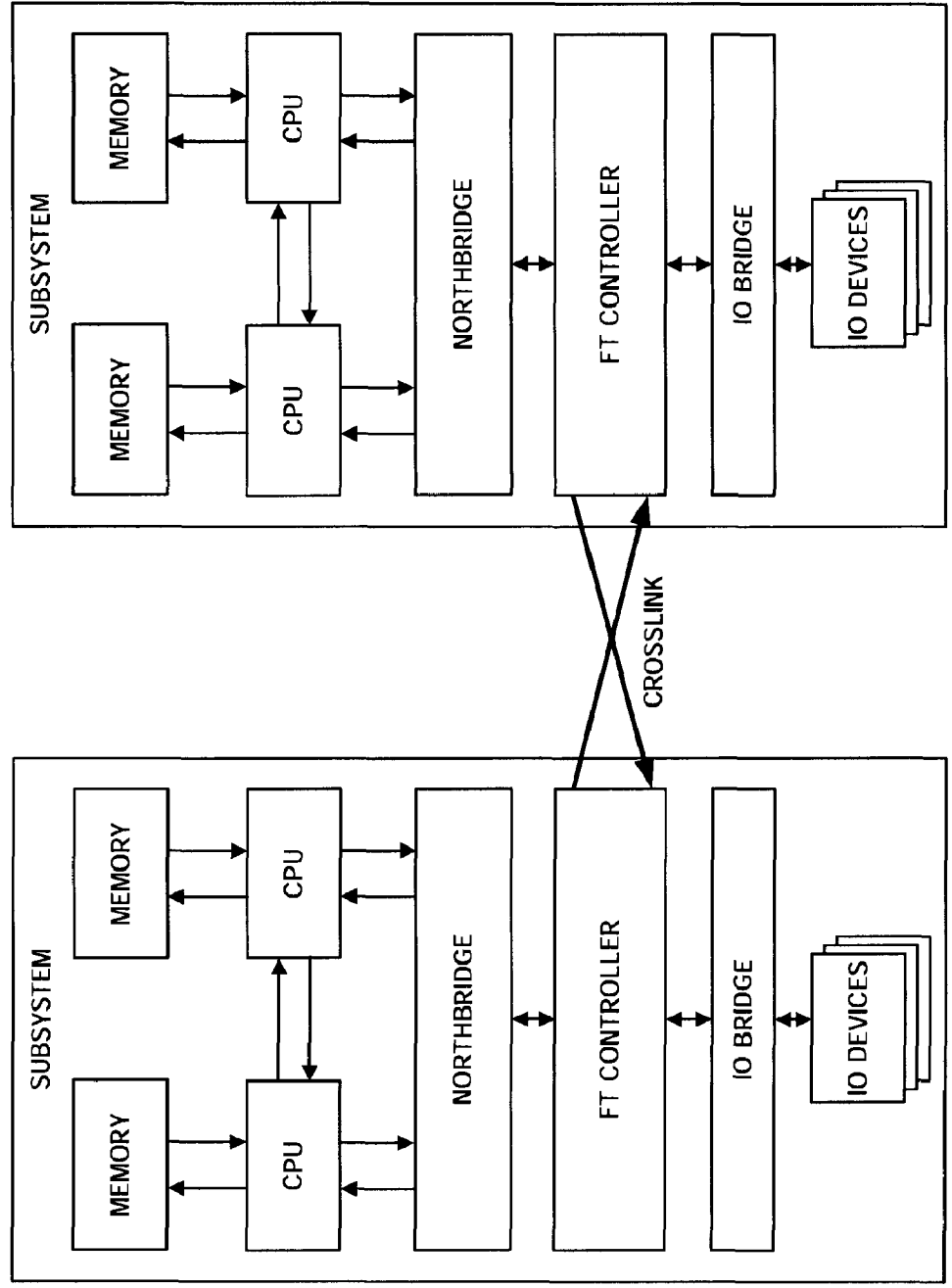
FIG. 9 is a block diagram showing the composition of a related fault-tolerant system.

In addition, the composition may also mix bridges and snoopers. FIG. 8 shows a fault-tolerant system 300 in which the bridges 71 to 74 utilized in the first exemplary embodiment are positioned between the CPU 21 and the memory 11, between the CPU 22 and the memory 12, between the CPU 21 and the northbridge 31 and between the CPU 22 and the northbridge 31, and the snooper 95 utilized in the second exemplary embodiment is positioned between the CPU 21 and the CPU 22. In this case, too, it is possible to detect process discrepancies between the subsystems 1 and 2 by the bridges 71 to 74 and the snooper 95 similarly creating checksums from relayed packets and sending these checksums to the FT controller 41.

In addition, in the exemplary embodiments, checksums were created from parallelized data after parallelizing serial data exchanged among the various components, but checksums may also be created directly from serial data that has not been parallelized.

Furthermore, in the exemplary embodiments the data exchanged among the various components was explained as serial data, but the exemplary embodiments can be applied even when this is parallel data.

In addition, in the exemplary embodiments the bridges 71 to 75 and the snoopers 91 to 95 created and sent one checksum from the data of a plurality of exchanged packets, but it would also be fine not to execute this process and instead create and send a checksum each time a packet of data is exchanged.

What is claimed is:

1. A fault-tolerant system including a plurality of subsystems each similarly comprising a plurality of CPUs (Central Processing Units), memory, a northbridge, an IO bridge and software, with similar processes executed among said subsystems through a lockstep method, wherein each of said plurality of subsystems comprises: a control unit configured to relay communications between said northbridge and said IO bridge and configured to connect to other subsystems, an error detection data creation unit positioned at least either between said plurality of CPUs, between said CPU and said memory, or between said CPU and said northbridge, said error detection data creation unit creating a single error detection data from a packet of data each time the packet of data is exchanged between the pair between which said unit is positioned, and a signal transmission circuit configured to connect said error detection data creation unit and said control unit; wherein said control unit detects discrepancies in processes among said plurality of subsystems by comparing and detecting mismatches in error detection data created by said error detection data creation unit received via said signal transmission circuit and error detection data received from said other subsystems.

2. The fault-tolerant system according to claim 1, wherein said error detection data creation unit is a bridge configured to relay data exchanged between the pair between which said unit is positioned.

3. The fault-tolerant system according to claim 2, wherein said error detection data creation unit is a snooper configured to monitor data exchanged between the pair between which said unit is positioned.

4. The fault-tolerant system according to claim 3, wherein said error detection data creation unit creates a single error detection datum from a plurality of packets of data exchanged between the pair between which said unit is positioned.

5. The fault-tolerant system according to claim 4, wherein said error detection data creation unit parallelizes data exchanged between the pair between which said unit is positioned, and creates error detection data from said parallelized data.

6. A fault-tolerant system including a plurality of subsystems each similarly comprising a plurality of CPUs (Central Processing Units), memory, a northbridge, an IO bridge and software, with similar processes executed among said subsystems through a lockstep method, wherein each of said plurality of subsystems comprises: a control means for relaying communications between said northbridge and said IO bridge and for connecting to other subsystems, an error detection data creation means positioned at least either between said plurality of CPUs, between said CPU and said memory, or between said CPU and said northbridge, said error detection data creation means for creating a single error detection data from a packet of data each time the packet of data is exchanged between the pair between which said unit is positioned, and a signal transmission circuit for connecting said error detection data creation means and said control means; wherein said control means for detecting discrepancies in processes among said plurality of subsystems by comparing and detecting mismatches in error detection data created by said error detection data creation means received via said signal transmission circuit and error detection data received from said other subsystems.

* * * * *